United States Patent [19]

Tracht

[11] Patent Number: 4,825,134

[45] Date of Patent: Apr. 25, 1989

[54] INTERMITTENT WIPER CONTROL CIRCUIT WITH INSTANT WIPE

[75] Inventor: Steven L. Tracht, Dayton, Ohio

[73] Assignee: General Motors Corporation, Detroit, Mich.

[21] Appl. No.: 211,604

[22] Filed: Jun. 27, 1988

[51] Int. Cl.⁴ .............................................. B60S 1/08
[52] U.S. Cl. ............................... 318/443; 318/DIG. 2
[58] Field of Search ................... 318/443, 444, DIG. 2

[56] References Cited

U.S. PATENT DOCUMENTS

| | | | |
|---|---|---|---|
| 3,262,042 | 7/1966 | Amos | 318/DIG. 2 X |
| 3,333,174 | 7/1967 | Moller et al. | 318/443 |
| 3,364,410 | 1/1968 | Foreman | 318/443 |
| 3,492,558 | 1/1970 | Patterson, Jr. et al. | 318/443 |
| 3,614,573 | 10/1971 | Rieman et al. | 318/443 |
| 3,644,744 | 2/1972 | Holt | 307/10 |
| 3,869,654 | 3/1975 | Bischoff | 318/443 |
| 4,419,611 | 12/1983 | Kawasaki et al. | 318/443 |
| 4,492,904 | 1/1985 | Graham | 318/444 |
| 4,588,935 | 5/1986 | Kaneiwa et al. | 318/DIG. 2 X |
| 4,689,536 | 8/1987 | Iyoda | 318/DIG. 2 X |
| 4,703,237 | 10/1987 | Hochstein | 318/DIG. 2 X |

Primary Examiner—Bentsu Ro
Attorney, Agent, or Firm—Robert M. Sigler

[57] ABSTRACT

A vehicle windshield wiper control circuit in which the first wipe cycle is initiated with closure of the wiper activation switch in intermittent operation. The control circuit uses a voltage comparison arrangement in which a voltage divider, with an instant wipe capacitor connected across the output, has a normal output voltage ineffective to produce motor drive for wiper actuation but produces a different output voltage through electric current diversion from one of its series resistors with the wiper activation switch open which is effective, immediately upon closure of the wiper activating switch, to initiate a wipe cycle, the instant wipe capacitor thereafter charging to the normal output voltage before another wipe cycle can be initiated.

5 Claims, 1 Drawing Sheet

INTERMITTENT WIPER CONTROL CIRCUIT WITH INSTANT WIPE

BACKGROUND OF THE INVENTION

This invention relates to a vehicle windshield wiper control having intermittent wipe operation in which a wipe cycle occurs immediately upon initiation of intermittent wipe. A vehicle operator initiates intermittent wipe when the moisture is accumulating on the windshield at a rate too slow for constant wipe. However, even when intermittent wipe is chosen, the operator generally desires and expects the first wipe cycle to occur immediately, before the first pause.

A variety of circuit arrangements are provided in the prior art for instant wipe in intermittent wiper operation. One such uses a normally closed relay or transistor switch in intermittent operation which is opened only during the pause time as the pause timing capacitor is charged and then returns to its naturally closed position. Since the relay or transistor switch is in its closed position or ready to be instantly activated as soon as the wiper activating switch is activated to its intermittent position, instant wipe is obtained. An example using a relay is seen in FIG. 2 of U.S. Pat. No. 3,262,042 to Amos, issued July 19, 1966. The disadvantage of this approach is that it greatly limits the design possibilities for the remainder of the wiper control circuit.

Some intermittent wiper control circuits are designed to provide instant wipe by charging the instant wipe capacitor as soon as the vehicle ignition switch is closed, while the wiper switch is still in its off position. The capacitor is then maintained in a fully charged condition, ready to initiate a wipe cycle as soon as the wiper activating switch is closed. An example is seen in U.S. Pat. No. 3,869,654 to Bischoff et al, issued Mar. 4, 1975. This method also places limitations on the design of the wiper control circuit and is not suitable for all such circuits.

Another method of providing instant wipe is the inclusion of an additional contact in the wiper switch which is passed over by the moving contact between its off position and its intermittent or pulse position. This extra contact provides for low speed operation through the same circuitry as when the activating switch is in the low speed position; however, since it is closed only momentarily, it is just sufficient to initiate a first wipe cycle before the moving contact moves on to its intermittent position. The wipe cycle is finished by the usual circuitry through the inner wipe switch and the intermittent or pulse circuitry takes over at the completion of the first wipe cycle. For example, the circuit of FIG. 1 could be modified for such an instant wipe feature by moving contacts 40 and 48 of the wiper activating switch 37 to the left along with the MIST and OFF positions of the moving contact. The newly created position would have an additional contact connected in series between contacts 48 and 50 and an extension of contact 38 to the left. The moving contact would not be allowed to stop in the newly created position but would connect the additional contact to contact 38 briefly on its way to the left from the OFF position to the PULSE position. The disadvantage of this method is the complication of design in the wiper activating switch, since and extra contact is required which must provide contact for a predictable time with another contact moving at an unpredictable speed.

SUMMARY OF THE INVENTION

The object of this invention is to provide such a vehicle windshield wiper control with intermittent operation in which the first wipe cycle is initiated with closure of the wiper activation switch in intermittent operation. The invention uses a voltage comparison arrangement in which a voltage divider has a normal output voltage ineffective to produce motor drive for wiper actuation but produces a different output voltage through electric current diversion from one of its series resistors with the wiper activation switch open which is effective, immediately upon closure of the wiper activating switch, to initiate a wipe cycle, with a capacitor across the voltage divider charging to the normal output voltage before another wipe cycle can be initiated.

In particular, the invention is a wiper control circuit for a vehicle having a windshield, a wiper, an electric power source and an electric motor linked to the wiper to drive the wiper through repeating cycles across the windshield between inner and outer wipe positions.

The wiper control circuit comprises an inner wipe switch closed throughout the cycle of the wiper except for a small range defining an inner wipe position in which wiper pause is desired, a wiper activating switch, a first voltage divider comprising first and second resistors connected in series across the electric power source to define an output at their junction normally effective to provide a first predetermined voltage thereon and an instant wipe capacitor connected across the output of the voltage divider in parallel with the second resistor.

The wiper control circuit further comprises a first comparator having one input connected to the output of the first voltage divider, another input and an output, first motor drive means connected to the output of the first comparator and activated thereby to connect the electric motor across the electric power source for activation thereof when the voltage at the other input thereof exceeds the voltage at the one input, the first motor drive means being similarly activated by closure of the inner wipe switch to latch itself in an activated state through each wipe cycle, once started, until the inner wipe switch opens, and first circuit means connected across the electric power source effective to provide from an output thereof to the other input of the first comparator a second predetermined voltage less than the first predetermined voltage when the wiper activating switch is closed and a third predetermined voltage less than the second predetermined voltage when the wiper activating switch is open.

The wiper control circuit finally comprises second circuit means connected across the electric power supply and responsive to the wiper activating switch to modify the voltage on the output of the voltage divider by diverting electric current from the second resistor, when the wiper activating switch is open, in sufficient quantity to lower the output voltage of the voltage divider to a fourth predetermined voltage less than the second predetermined voltage but, when the wiper activating switch closes, to stop taking electric current from the second resistor. The result is that closure of the wiper activating switch initially provides the second and fourth predetermined voltages to the other and one inputs, respectively, of the first comparator for activation of the first comparator in an instant wipe cycle and initiates charging of the instant wipe capacitor through the first resistor; and the instant wipe capacitor thereafter reaching the first predetermined voltage before another wipe cycle can be initiated. Further details and advantages of the invention will be apparent from the accompanying drawings and following description of a preferred embodiment.

DESCRIPTION OF THE PREFERRED EMBODIMENT

Figure 1:
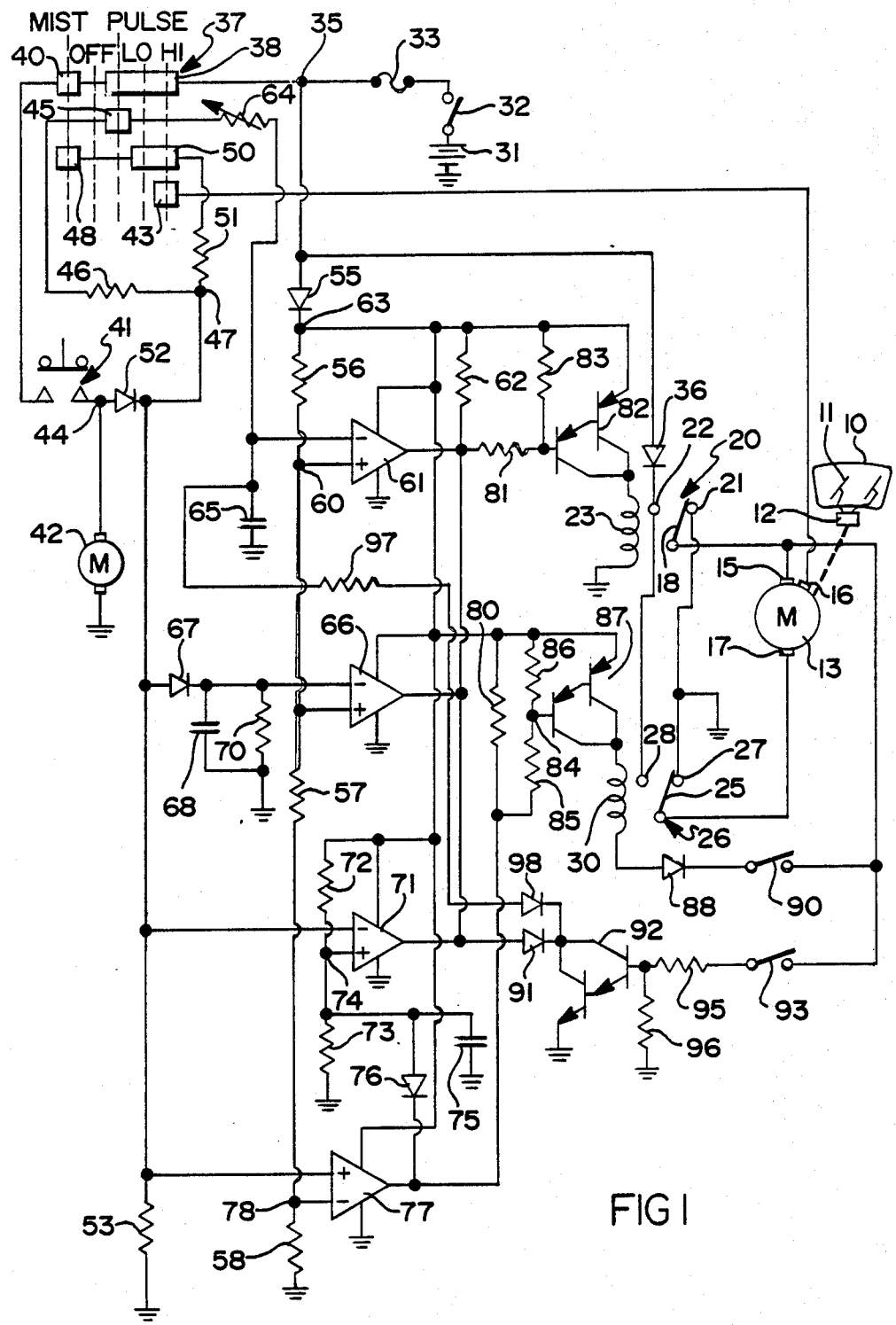
FIG. 1 shows a circuit diagram of a wiper control according to the invention.

Referring to FIG. 1, a motor vehicle windshield 10 is provided with one or more wipers 11 driven through a predetermined wipe pattern through a drive mechanism 12 by a reversible, DC, permanent magnet motor 13. Motor 13 is a standard '1 brush motor with a low speed brush 15, a high speed brush 16 and a common brush 17. Motor 13 rotates in a forward direction at low speed with current from brush 15 to brush 17, in a forward direction at high speed with current from brush 16 to brush 17 and in a reverse direction at low speed with current from brush 17 to brush 15.

Brush 15 is connected to the armature 18 of a relay 20 having a normally closed contact 21, a normally open contact 22 and an actuating coil 23. Brush 17 is connected to the armature 25 of a relay 26 having a normally closed contact 27, a normally open contact 28 and an actuating coil 30. The normally closed contacts 21 and 27 are both grounded.

An electric power source is symbolized by battery 31 having one terminal grounded and the other connected through the vehicle ignition switch 32 and a fuse 33 to a junction 35. Battery 31 is assumed to provide 13.5 volts in this embodiment for purposes of demonstration, although this is not a requirement of the invention. Junction 35 is connected through a diode 36 to normally open contacts 22 and 28 of relays 20 and 26, respectively, to provide operating current to activate motor 13 at low speed in the forward direction with the activation of relay 20 and in the reverse direction with the activation of relay 26.

A wiper activating switch 37 comprises a contact 38 and a contact 40 spaced to the left from contact 38 in FIG. 1 and connected in series therewith from junction 35 and further in series with a washer switch 41 and washer motor 42 to ground. Closure of washer switch 41 with ignition switch 32 closed thus completes a circuit through washer motor 42 to activate a washer, not shown, for windshield 10 as long as the circuit is complete.

Wiper activating switch 37 further comprises a contact 43 aligned with the right end of contact 38 and connected to high speed brush 16 of motor 13. It further comprises a contact 45 aligned with the left end of contact 38 and connected through a resistor 46 (65K) to a junction 47, a contact 48 aligned with contact 40, and a contact 50 aligned with the right end and center of contact 38 and connected in series with contact 48 and a resistor 51 (35K) to junction 47. The junction 44 of washer switch 41 and motor 42 is further connected through a diode 52 to junction 47, which junction is connected through a resistor 53 (47K) to ground. A sliding contact is provided for wiper switch 37, the sliding contact being indicated in its various positions as labeled in FIG. 1 by the vertical dashed lines. When in the OFF position, the sliding contact is in the space between contacts 38 and 40 and does not connect any contacts. In this case, junction 47 is essentially at ground voltage. The sliding contact connects contacts 40 and 48 in the MIST position and contacts 38 and 50 in the LO position. In either case, junction 47 is established at 7.44 volts. In the pulse position, the sliding contact connects contacts 38 and 45 to establish 5.38 volts on junction 47. In the HI position, the sliding contact connects contacts 43, 50 and 38 to establish 7.44 volts at junction 47 and connect the high speed brush 16 of motor 13 to battery 31. Thus, switch 37 provides a multiplexed voltage on junction 47 in its various positions.

A number of comparators are provided, each of which has junction 47 connected to one input thereof and one of several reference voltages provided to the other input thereof. The reference voltages are provided by a voltage divider comprising a diode 55 and three resistors 56, 57 and 58 (all 47K) connected in series between junction 35 and ground. Junction 60 of resistors 56 and 57 is established at 8.53 volts and connected to the non-inverting input of comparator 61, which has an output connected through a pull-up resistor 62 (1K) to a junction 63 of diode 55 and resistor 56. Comparator 61 further has an inverting input connected through a capacitor 65 (33 uF) to ground and through a variable resistor 64 (35-675K) to contact 45 of switch 37. Comparator 61 will be referred to as the pulse comparator, since it will be seen below that it controls pulse operation, with the exception of the first or instant wipe.

A comparator 66 has an output connected to the output of comparator 61 and a non-inverting input also connected to junction 60. Junction 47 is connected through a diode 67 to the inverting input of comparator 66, with a capacitor 68 (22 uF) and resistor 70 (510K) connected in parallel from the inverting input to ground. Comparator 66 is used to provide wiper actuation during windshield washing and will thus be called the wash comparator.

A comparator 71 has an output connected to the output of comparator 61, an inverting input connected to junction 47 and a non-inverting input connected to the junction 74 of resistors 72 and 73 (both 100K) connected in series between junction 63 and ground. Comparator 71 activates the wiper in low speed operation and further helps provide the instant wipe in pulse operation. It will thus be called the instant wipe comparator. Comparator 71 is further connected through a capacitor 75 (15 uF) to ground and through a diode 76 to the output of a comparator 77 having a non-inverting input connected to junction 47 and an inverting input connected to a junction 78 of resistors 57 and 58, which is established at 4.27 volts. The output of comparator 77 is connected through a resistor 80 (1K) to junction 63, which junction also provides the high operating voltage for the comparators, the low operating voltage being ground. Comparator 77 will be called the park comparator, since it provides reverse motor operation for parking.

The output of pulse comparator 61 is further connected through a resistor 81 (47K) to the base of a Darlington PNP transistor 82 having an emitter connected to junction 63 and a collector connected through actuating coil 23 of relay 20 to ground. The base of transistor 82 is also connected through a resistor 83 (510K) to junction 63. The output of park comparator 77 is further connected through a pair of series resistors 85 (47K) and 86 (510K) to junction 63. The junction 84 of resistors 85 and 86 is connected to the base of a Darlington PNP transistor 87 having an emitter connected to junction 63 and a collector connected through actuating coil 30 of relay 26 in series with a diode 88 and park switch 90 to low speed brush 15 of motor 13. Park switch 90 is a standard park switch of the type that is closed as the wipers descend from their normal pattern toward a depressed park position out of the normal wipe pattern and opens when the depressed park position is reached.

The output of instant wipe comparator 71 is connected through a diode 91 to the collector of a Darlington NPN transistor 92 having a grounded emitter. Low speed brush 15 of motor 13 is connected through an inner wipe switch 93 and series resistor 95 (47K) to the base of transistor 92, with a resistor 96 (510K) connected from the base of transistor 92 to ground. Inner wipe switch 93 is a switch that is closed throughout the wiper pattern of wipers 11 except for a small angle at the inner wipe position, which defines the end of the wipe pattern adjacent the depressed park position. Finally, the inverting input of pulse comparator 61 is further connected through a resistor 97 (270) and diode 98 in series to the collector of transistor 92.

The operation of the wiper control begins with closure of ignition switch 32 with the wipers parked and wiper control switch 37 in its OFF position. The closure of switch 32 provides battery voltage at junction 35 and one diode drop less at junction 63. The voltage at junction 47 is at ground; and the output voltage of park comparator 77 goes low to hold down the voltage on capacitor 75 and thus the voltage at the non-inverting input of instant wipe comparator 71 to approximately 1.8 volts. The low output of comparator 77 also enables transistor 87 for conduction; but the open park switch 90 in the collector circuit with the wipers parked prevents such conduction. The other comparators all have outputs floating high, and none of the Darlington transistors is conducting; however, comparator 71 is set up for instant wipe.

If the sliding contact of switch 37 is now moved to its PULSE position, the voltage at junction 47 rises to 5.38 volts with the voltage divider action of resistors 46 and 53. This is sufficiently high to release comparator 77: and its output no longer pulls down the voltage on capacitor 75. However, before capacitor 75 can charge up significantly through resistor 72, the voltage on junction 47 causes instant wipe comparator 71 to switch to a low output, which turns on transistor 82 to activate relay 20 and connect the low speed brush 15 of motor 13 to battery 31. Motor 13 drives wipers 11 out of the depressed park position into the wipe pattern. When the wipers pass the inner wipe position into the wipe pattern, inner wipe switch 93 closes and turns on transistor 92, which latches on transistor 82 through diode 91. The voltage on capacitor 75 charges up to half the voltage at junction 63, which is greater than the voltage on junction 47 and causes the release of comparator 71 from its low output condition. Transistor 82 remains latched on by transistor 92, however, until the wipers once again reach inner wipe, whereupon switch 93 opens, transistors 92 and 82 turn off, and the wipers pause.

From the moment switch 37 was switched to the PULSE position, battery voltage was connected through variable resistor 64; however, charging current for capacitor 65 was shunted away by transistor 92 through diode 98. As soon as transistor 91 stops conducting, however, capacitor 65 begins to charge at a rate established by the operator chosen resistance of variable resistor 64. The variable RC time constant of capacitor 65 and resistor 64 is sufficient to provide for delays from a small fraction of a second to many seconds. When the voltage on capacitor 65 finally reaches the 8.53 volts established on the non-inverting input of pulse comparator 61, the output of comparator 61 goes low to turn on transistor 82, activate relay 20 and start motor 13. When inner wipe switch 93 once again closes, transistor 92 once again latches on transistor 82 and discharges capacitor 65. Comparator 61 is released from its low output, but the motor is latched into another wipe cycle. The operation then repeats itself as described above, with alternating wipe cycles and pauses, until the position of switch 37 is changed.

If switch 37 is moved to the LO position, battery voltage at junction 35 is connected through switch 37 to contact 50; and the voltage on junction 47 changes to 7.44 volts. The inverting input of comparator 71 thus rises in voltage above the non-inverting input thereof; and comparator 71 pulls its output low to activate transistor 82 and relay 20. Motor 13 is thus connected to run forward in continuous low speed operation. If switch 37 is moved to the MIST position, the same result is achieved through contact 48, which is connected to contact 50. However, switch 37 is mechanically spring biased to return from the MIST position to the OFF position when released, whereas it is not so biased from any other position. Therefore, low speed operation, in the MIST position, will continue only to the completion of the cycle in which switch 37 is released; whereas, in the LO position of switch 37, it will continue until switch 37 is moved.

In the HI position, switch 37 provides for activation of relay 20 as in the LO position but activation of relay 20 as in the LO position but further connects junction 35 through contact 43 directly to high speed brush 16 of motor 13. The motor will thus run at high speed in continuous forward operation. Diode 36 prevents the 18 volts generated by motor 13 on low speed brush 15 from generating a current back into the circuit.

When switch 37 is moved to the OFF position, the voltage on junction 47 drops to ground, comparator 77 goes low and the other comparators are all released from any low condition they might have been in. Since park switch 90 is connected to battery 31 through relay 20, transistor 87 remains off; and relay 26 is not actuated. Transistor 82 remains latched on to drive motor 13 forward at low speed until the current wipe cycle is complete and inner wipe switch 93 opens. At this point transistor 82 stops conducting to release relay 20, which allows transistor 87 to activate relay 26 and connect motor 13 to operate in the reverse direction. Wipers 11 are equipped with a reverse park drive mechanism which drives the wipers out of the wipe pattern and down to a depressed park position with reverse motor operation. Such mechanisms are well known in the prior art and are thus not described here in detail. When the wipers reach the designated depressed park position, park switch 90 opens to stop motor 13. Meanwhile, capacitor 75 has been discharged to its low initial voltage by the output of comparator 77 to set up the system for instant wipe as described above with the next activation of switch 37 to one of its other positions.

With switch 37 in the OFF position, washer switch 41 may be closed to provide windshield washing. Closure of switch 41 activates washer motor 42 directly therethrough to activate a standard washer pump, not shown, to deposit a cleaning fluid on the windshield. It also provides battery voltage, less the diode drop of diode 52, to junction 47 and charges up capacitor 68 through diodes 52 and 67. The high voltage on junction 47 is sufficient to activate wash comparator 66 for low speed wiper operation as long as switch 41 is held closed. Switch 41 is spring loaded to the open position; and when it is released, the voltage on junction 47 drops to ground again. However, diode 67 and the essentially infinite input impedance of wash comparator 66 prevent capacitor 68 from discharging except through resistor 70. Capacitor 68 and resistor 70 thus form a timer which maintains comparator 66 in its low output condition for a predetermined time after switch 41 is allowed to open. This provides some extra wipe cycles to clear the windshield of the cleaning fluid. When capacitor 68 finally discharges sufficiently to release comparator 66 from its low output state, the wipers are driven through their final cycle by the latching action of transistor 92 and parked as previously described.

The embodiments of the invention in which an exclusive property or privilege is claimed are defined as follows:

1. A wiper control circuit for a vehicle having a windshield, a wiper, an electric power source and an electric motor linked to the wiper to drive the wiper through repeating cycles across the windshield between inner and outer wipe positions, the wiper control circuit comprising, in combination:

an inner wipe switch closed througout the cycle of the wiper except for a small range defining an inner wipe position in which wiper pause is desired;

a wiper activating switch;

a first voltage divider comprising first and second resistors connected in series across the electric power source to define an output at their junction normally effective to provide a first predetermined voltage thereon;

an instant wipe capacitor connected across the output of the voltage divider in parallel with the second resistor;

a first comparator having one input connected to the output of the first voltage divider, another input and an output;

first motor drive means connected to the output of the first comparator and activated thereby to connect the electric motor across the electric power source for activation thereof when the voltage at the other input thereof exceeds the voltage at the one input, the first motor drive means being similarly activated by closure of the inner wiper switch to latch itself in an activated state through each wipe cycle, once started, until the inner wipe switch opens;

first circuit means connected across the electric power source effective to provide from an output thereof to the other input of the first comparator a second predetermined voltage less than the first predetermined voltage when the wiper activating switch is closed and a third predetermined voltage less than the second predetermined voltage when the wiper activating switch is open; and second circuit means connected across the electric power source and responsive to the wiper activating switch to modify the voltage on the output of the voltage divider by diverting electric current from the second resistor, when the wiper activating switch is open, in sufficient quantity to lower the output voltage of the voltage divider to a fourth predetermined voltage less than the second predetermined voltage but, when the wiper activating switch closes, to stop taking electric current from the second resistor, whereby closure of the wiper activating switch initially provides the second and fourth predetermined voltages to the other and one inputs, respectively, of the first comparator for activation of the first comparator in an instant wipe cycle and initiates charging of the instant wipe capacitor through the first resistor, the instant wipe capacitor thereafter reaching the first predetermined voltage before another wipe cycle can be initiated.

2. The wiper control circuit of claim 1 in which the first circuit means comprises a second voltage divider in series with the wiper activating switch and having an output and the second circuit means comprises:

a third voltage divider across the electric power source having an output defining a fifth predetermined voltage between the second and third predetermined voltages;

voltage comparing switch means having one control input connected to the output of the third voltage divider, another control input connected to the output of the second voltage divider and a switched current path connected in series with a diode between the electric power source and the other input of the first comparator so as to divert current flow away from the second resistor when the voltage on the one control input exceeds that on the other control input.

3. The wiper control circuit of claim 1 in which the first motor drive means comprises a first transistor controlled switch means activatable by the output of the first comparator to connect the electric motor across the electric power source for motor operation in a first direction producing wipe cycles and further activate, through the inner wipe switch when closed, a second transistor controlled switch means to activate the first transistor controlled switch means in a latching action while the inner wipe switch is closed.

4. The wiper control circuit of claim 3 further comprising, in combination:

a pause timing capacitor connected in series with a pause control resistor and the wiper activating switch across the electric power source;

a second comparator effective to activate the first transistor controlled switch means to begin another wipe cycle when the voltage on the pause timing capacitor exceeds a sixth predetermined voltage; and capacitor discharge means activated by the second transistor controlled switch means to discharge the pause timing capacitor to a seventh predetermined voltage less than the sixth predetermined voltage while the inner wipe switch is closed.

5. The wiper control circuit of claim 2 further comprising, in combination:

a park switch closed except at a park position;

second motor drive means comprising a third transistor controlled switch means activatable by the voltage comparing switch means only when the voltage on the one control input thereof exceeds the voltage on the other input thereof and the park switch is closed to connect the electric motor across the electric power source for motor operation in a second direction until the park switch opens.

* * * * *